United States Patent [19]
Epstein

[11] 3,882,393
[45] May 6, 1975

[54] COMMUNICATIONS SYSTEM UTILIZING MODULATION OF THE CHARACTERISTIC POLARIZATIONS OF THE IONOSPHERE

[75] Inventor: Mark R. Epstein, Chevy Chase, Md.

[73] Assignee: United States of America as represented by the Secretary of the Navy, Washington, D.C.

[22] Filed: June 4, 1973

[21] Appl. No.: 366,932

[52] U.S. Cl. .......... 325/56; 343/100 PE
[51] Int. Cl. .......... H04b 7/10
[58] Field of Search .......... 325/56, 60; 343/100 PE

[56] References Cited

UNITED STATES PATENTS

| | | | |
|---|---|---|---|
| 2,985,875 | 5/1961 | Grisdale et al. | 325/56 |
| 3,238,527 | 3/1966 | Vogt | 343/100 PE |
| 3,353,182 | 11/1967 | Hart | 343/100 PE |
| 3,430,156 | 2/1969 | Katzin | 325/56 |
| 3,435,454 | 3/1969 | Vogt | 343/100 PE |
| 3,760,274 | 9/1973 | Vogt | 325/60 |

*Primary Examiner*—George H. Libman
*Attorney, Agent, or Firm*—R. S. Sciascia; Charles D. B. Curry

[57] ABSTRACT

A system for high frequency ionospheric radio communication utilizing transmitting and receiving antenna polarizations which are adjusted to take into account specific properties of the ionospheric medium and comprising two sets of transmitters, receivers and antennas that send and receive polarized waves. Two channels of information can be received at a single RF transmitted frequency. An RF exciter circuit provides the excitation to two mixers each of which is driven by two signal sources. The outputs of the mixers are then amplified to drive the antennas.

3 Claims, 5 Drawing Figures

COMMUNICATIONS SYSTEM UTILIZING MODULATION OF THE CHARACTERISTIC POLARIZATIONS OF THE IONOSPHERE

BACKGROUND OF THE INVENTION

1. Field of the Invention

The subject matter of the present invention relates generally to a unique improved method and system for high frequency ionospheric radio communication and more particularly to a system for skywave radio communications utilizing transmitting and receiving antennas having polarizations adjusted for the specific effects the ionospheric medium may have on the polarization of the transmitted wave. This unique invention and its embodiments may be coupled with existing communication systems to provide an additional communications channel over which information may be transmitted.

2. Description of the Prior Art

The ionosphere, due to the presence of the earth's magnetic field and free electrons, is an electrically anisotropic medium. Specifically, it is a doubly refracting medium. This means that any single radio wave, which is incident upon the medium, will travel through the medium as two nearly-independent waves having specific unchanging, or characteristic, polarizations. The polarization of each of the two waves is defined at each point in the assumed slowly-varying medium as a function of the local electron density and the direction of the radio wave propagation with respect to the earth's magnetic field. This is in marked contrast to the case of zero magnetic field or free space propagation where a radio wave of arbitrary polarization propagates without any change in the wave polarization.

SUMMARY OF THE INVENTION

Briefly, the present invention is a system for high frequency ionospheric radio communication utilizing transmitting and receiving antenna polarizations which include compensation for the specific properties of the ionospheric medium and comprises two sets of transmitters, receivers and antennas that send and receive polarized waves. The two channels of information communicates on a single RF transmitted frequency. An RF exciter circuit provides the excitation to two mixers, each of which is driven by two signal sources. The outputs of the mixers are then amplified to drive the antennas. This unique method and system can be conveniently added to existing communications systems to provide an additional communicative channel. Some features of the characteristically polarized communication techniques are as follow: (1) Fading and signal distortion effects due to rotation of the plane of polarization as a function of both frequency and time are eliminated when characteristically polarized antennas are employed for one-hop-paths. (2) The technique of modulating characteristically polarized waves simultaneously with other forms of modulation may be performed without recourse to additional transmitter equipment or frequency allocations.

STATEMENT OF THE OBJECTS OF THE INVENTION

A primary object of the present invention is to provide a new and improved signal communication system utilizing antennas which possess the polarization of the ionospheric characteristic waves in the region where the radio energy enters and leaves the ionosphere.

Another object of the present invention is to provide a signal transmission system operating at a fixed carrier frequency which by the use of characteristically polarized antennas increases the communications channel capacity above that of conventional systems.

Other objects, advantages and novel features of the invention will become apparent from the following detailed description of the invention when considered in conjunction with the accompanying drawings.

DESCRIPTION OF THE PREFERRED EMBODIMENTS

Figures 1, 2:
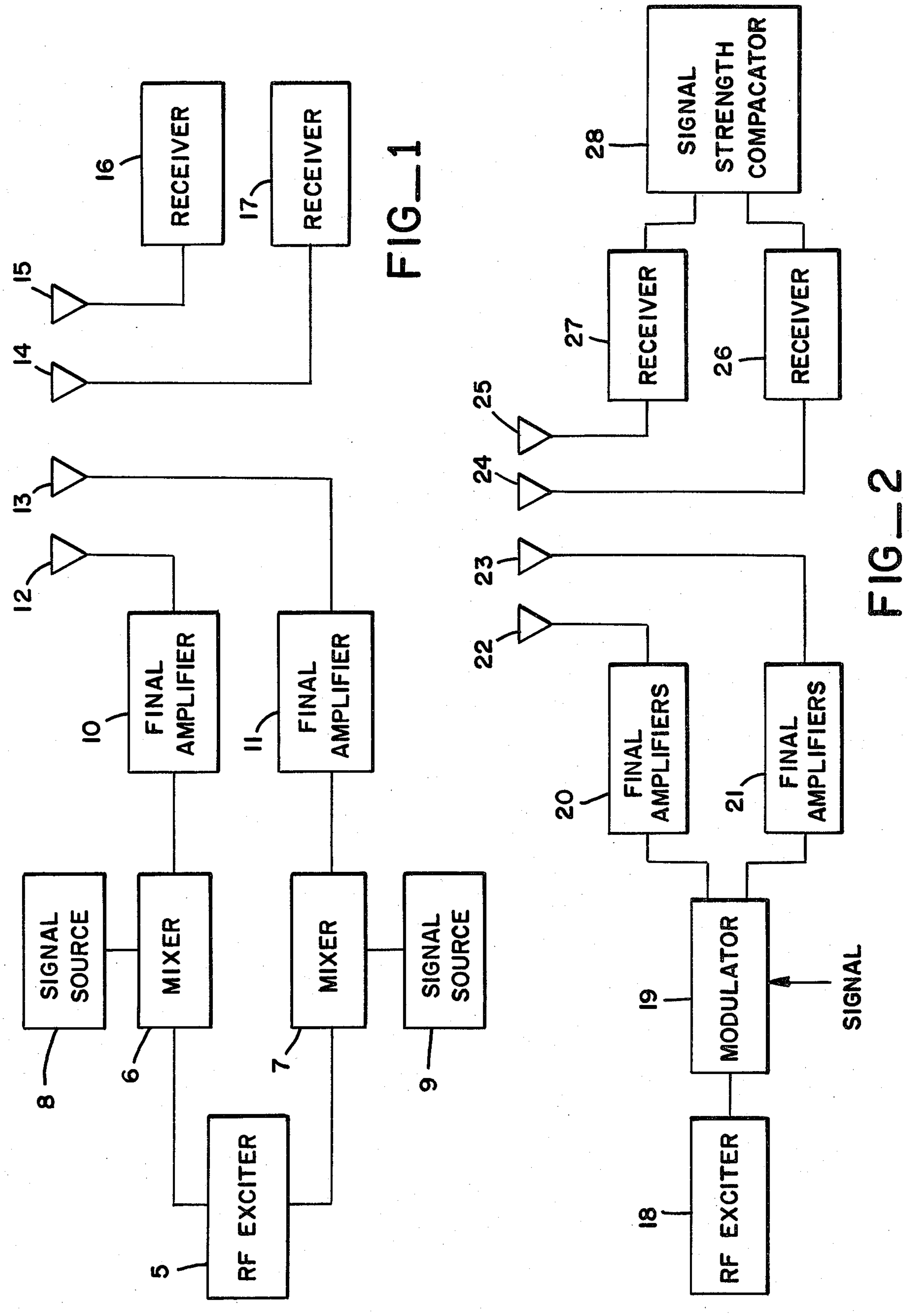
FIG. 1 is a schematic illustration of an ionospheric radio communications system showing the use of two sets of transmitters, receivers and antennas that launch and receive characteristically polarized waves.
FIG. 2 is a schematic illustration of an ionospheric radio communication system in which one transmitter and one receiver are employed with two characteristically polarized antennas.

Before describing the unique system in detail it will be necessary to review some basic concepts and terms concerning radio propagation in the ionsphere.

For radio propagation purposes, the ionosphere may be considered an electron gas, physical properties of which are modified by the presence of the earth's magnetic field. Under such circumstances, there are two characteristic waves defined for each point in the medium. The ionospheric characteristic polarizations of these waves, as determined from the Appleton-Hartree equations, vary as a function of the orientation of the wave normal of the propagating wave with respect to the direction of the earth's magnetic field at a given point in space, and hence, vary as a function of distance along the part of the ray trajectory within the ionosphere. The transmitted wave polarizations for oblique-path communication that will travel through the ionosphere as a single wave, called the entering limiting polarizations, are a function of the polarizations of the characteristic waves within the region where the wave enters the ionosphere. Similarly, the characteristic wave polarizations that will be incident upon the receiving antenna are a function of the exiting limiting polarizations in the region where the wave leaves the ionosphere proceeding towards the receiving location. The set of characteristic polarizations corresponding to a given ray path may be determined from magnetic dip charts, an estimate of bottom-layer ionospheric electron density and predicted ray path, since the characteristic polarizations are only a function of ionospheric electron density and the angle between the earth's magnetic field and ray path.

Experimentation has demonstrated that for an ionospheric propagation path a single transmitted characteristically polarized wave will result in the appearance of a single characteristically polarized wave at the receiver location. Whether or not the received polarization will be the same polarization as that transmitted is a function of the ionospheric exiting limiting polarizations.

This is a method of skywave communication which incorporates the above properties of the ionospheric medium. Specifically, it is proposed that the transmitted radio signal be modulated by varying the relative amounts of the energy transmitted via the characteristic wave polarizations by the use of characteristically polarized antennas. Each of the two characteristic wave components will travel through and be reflected from the ionosphere nearly independently. At the receiver characteristically polarized antennas are employed to receive the transmitted signals. Since the two characteristic waves do not interfere with one another, each of the characteristic waves may be transmitted at the same frequency with an independent modulation, for example AM, FM, and PCM, and be separately received and detected at the receiver.

It should be noted that when choosing antennas to be used in a characteristically polarized communication system, the characteristic polarizations corresponding to an entrance or an exit of the ionosphere over the path in question must be separately determined for each propagation path for the time of year in which the propagation is to occur because it is possible for the limiting characteristic polarizations of the ionosphere, at the end points of a fixed communications link, to vary with changes in reflecting height.

Considering first the problem of long-range ionospheric radio communication in which two separate communication channels are obtained at the same frequency, the illustrated embodiment of FIG. 1 shows a single RF exciter circuit 5 which provides the excitation to two mixers, 6 and 7, each of which in turn is driven by two signal sources, 8 and 9. The output signals of the two mixers go to two final amplifiers, 10 and 11, which in turn drive two antennas, 12 and 13. The antennas 12 and 13 are so adjusted that they launch waves that are identical to the two characteristic waves for propagation along the ray path within the region where the launched waves enter the ionosphere while proceeding in the direction of the receiving site. The transmitted waves are received using antennas 14 and 15. These antennas are chosen so that they correspond to the polarization of the two characteristic waves for propagation along the ray path within the region where the transmitted wave leaves the ionosphere proceeding toward the receiving location. The signals from antenna 15 are received using radio signal receiver 16; the signals from antenna 14 are received using radio signal receiver 17. The purpose of the receivers is to convert the radio frequency energy into signals resembling those produced by signal sources 8 and 9.

In the illustrated embodiment of FIG. 2, RF exciter 18 is employed to drive a modulator 19 which, for example, may be an on-off switch. Modulator 19 is used to divert energy from final amplifier 20 to final amplifier 21 in accordance with changes in the applied signal $S_A$. Final amplifiers 20 and 21 are used to drive antennas 22 and 23, so polarized as to match the polarization of the characteristic waves where the transmitted energy enters the ionosphere while traveling in the direction of the receiving location. An alternate arrangement for the transmitting equipment would be to perform the modulation after final amplification. The transmitted waves are received at the receiving site using antennas 24 and 25. Antennas 24 and 25 are designed to receive polarizations corresponding to the characteristic waves at the location where the transmitted wave leaves the ionosphere on its way to the receiving location. Signals received on antenna 24 are received with receiver 26 and signals received on antenna 25 are received with receiver 27. The output of the receiver, which may be at an intermediate or audio frequency, is then fed into a signal strength comparator network 28, the purpose of which is to determine the modulation that was applied at the transmitting location. If the modulator 19 was employed only with full energy into antenna 22 or 23, in accordance with the applied modulation, then the signal strength comparator 28 only determines whether the received signal strength was higher on antenna 24 or on 25 to provide the required demodulation.

Figures 3A, 3B, 4:
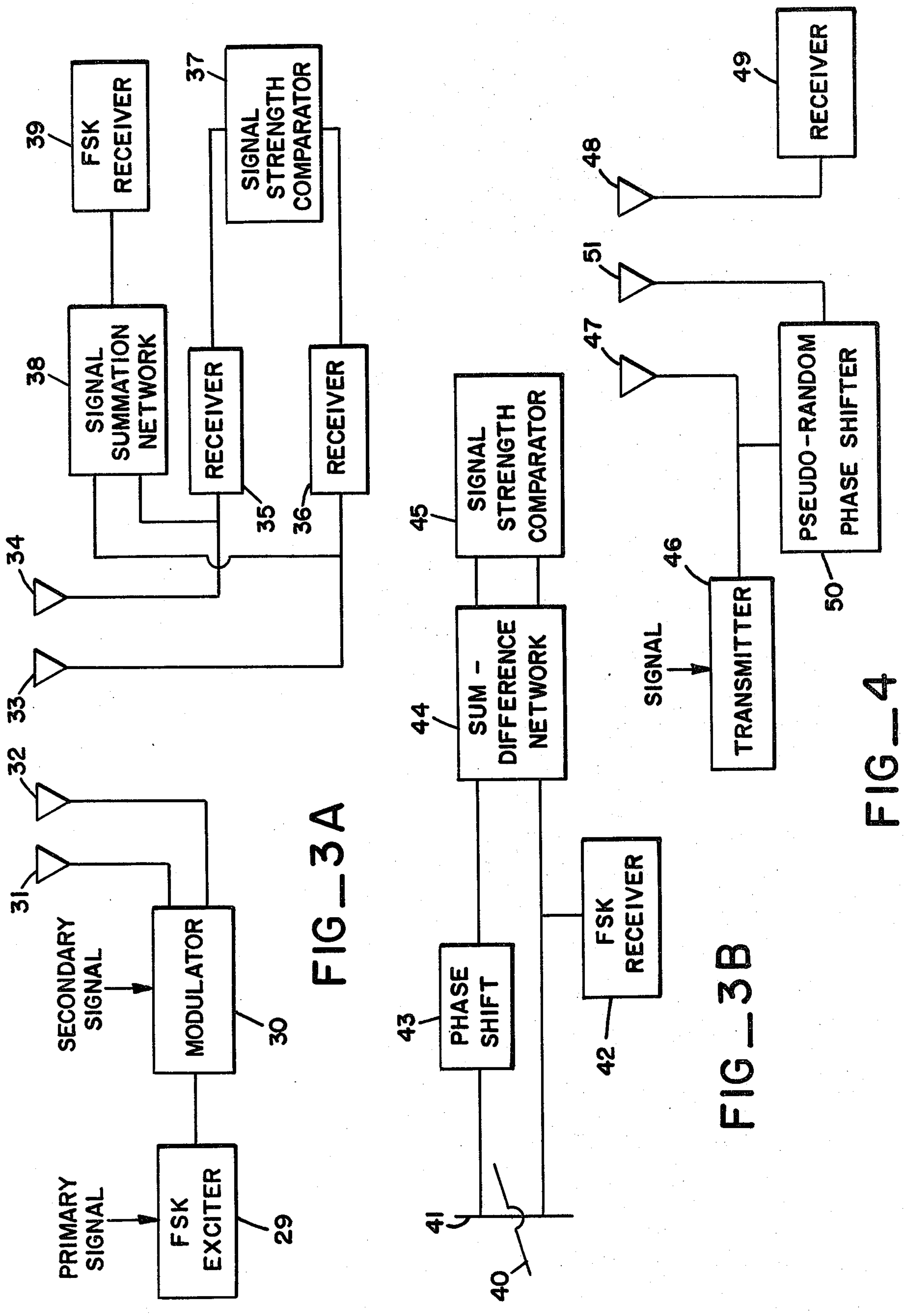
FIG. 3A and FIG. 3B are schematic illustrations of the basic systems of FIG. 1 and FIG. 2 showing how they may be added to an existing FSK telegraphic communication system to provide an additional communication channel.
FIG. 4 is a schematic illustration of an alternative embodiment of the invention in which the ionospheric characteristically polarized waves are used to "cover" a communications signal for which the concealment of the signal is desired.

In the illustrated embodiments of FIGS. 3A and 3B, a frequency shift keying exciter 29 is employed to provide a signal which in turn is a function of the primary signal, which enters a modulator 30, which in turn directs radio frequency energy to one of two characteristically polarized antennas, 31 and 32, in accordance with the secondary signal. The polarization of antennas 31 and 32 are determined by the polarizations of the characteristic waves where the transmitted energy enters the ionosphere while proceeding toward the receiving locations. This transmitting arrangement radiates an FSK signal such as is presently employed in commercial practice. The use of the switch modulator 30 and antennas 31 and 32 provide an additional channel of information, here illustrated as a carrier wave on-off signal. This additional channel is obtained by alternately radiating the transmitted FSK signal from antenna 31 and 32. The switching from one antenna to the other is performed simultaneously with the frequency keying in order to reduce the quantity of transients that are generated. At the receiving site characteristically polarized antennas 33 and 34, together with receivers 35 and 36 and signal strength comparator 37, determine which sense of polarization was transmitted and hence recover the secondary channel of information. Signals from 33 and 34 are combined in a single summation circuit 38 and received with a commercial FSK receiver 39 to derive the primary signal.

Another arrangement for the receiving site circuit of FIG. 3A, shown in FIG. 3B, illustrates a method for obtaining any given sense of antenna polarization. A horizontally polarized antenna 40 and a vertically polarized antenna 41 receive the transmitted signals. Antennas 40 and 41 may be situated at different heights above ground so that their radiation patterns will be similar as a function of elevation angle. The signals from antenna 40 are used directly to drive an FSK receiver 42, thereby providing the primary channel of information. A phase shift network 43 is employed to phase shift signals received on antenna 41 and, subsequently, signals from 40 and 41 are passed through a sum-difference network 44, the output signals of which are fed to a signal strength comparator 45. The phase shift network 43 is adjusted so that the effective polarization of the antennas at the output terminals off the sumdifference network 44 correspond to the characteristic waves as the exiting region of the ionosphere.

In the illustrated embodiment of FIG. 4, RF transmitter 46, including modulator networks, is used to drive an antenna 47, so polarized as to correspond to the polarization of characteristic waves at the entry region into the ionosphere as the waves proceed toward the receiving location. Such signals are received on the corresponding characteristically polarized antenna 48 at the receiving location and detected in a receiver 49, thereby providing a single communication channel. Secrecy of communication is obtained by employing a random phase shifter 50, also connected to the output of transmitter 46, to vary the phase of signals proceeding to antenna 51 polarization of which corresponds to the characteristic wave not excited by antenna 47. Phase shift network 50 is driven at a rate corresponding to the rate of modulation applied to by signal source to the modulator within transmitter 46. The net effect is that antennas 47 and 51 produce a wave of which the frequency of polarization variation is within the frequency band of the information that is being conveyed from antenna 47 and 48. The commonly employed linear polarization corresponds to characteristically polarized waves only for a very specially disposed ionospheric ray path; hence nearly all antennas employed for ionospheric communications are not characteristically polarized. Thus, the majority of recieving stations, with their noncharacteristically polarized receiving antennas, receive random amplitude modulation in the same frequency bands about the carrier as the information being transmitted, thereby causing confusion.

Although, in the course of the foregoing description, reference has been made to certain modes of operation and forms of embodiment of apparatus, the present invention is not intended to be limited to these forms or modes. It is understood that many modifications may be made without departing from the scope of the invention.

All of the transmitter/receiver components of the communications system illustrated in FIGS. 1 through 4 are generally standard components well known in the art. However, uniqueness of the communications system lies in the specific combination of components and their resultant function which is deemed the point of invention.

What is claimed is:

1. A method of communicating by way of the ionosphere comprising the steps of:

a. propagating a plurality of polarized radio frequency waves;

b. polarizing said propagated waves at the transmitting location to correspond to the polarization of the characteristic waves for propagation along a ray path of the ionosphere in the region where the transmitted energy enters the ionosphere on its way to a receiving location;

c. receiving said waves with receiving means which is polarized to correspond to the polarizations of the characteristic waves for propagation along the ray path of the ionosphere in the region where the electro-magnetic departs from the ionosphere in the direction proceeding towards the receiving station;

d. wherein the polarization of at least one of the receiving antennas does not correspond to the characteristic polarization within the energy region of entry; and e. wherein the polarization of at least one of the transmitting antennas and at least one of the recieving antennas does not correspond to the characteristic polarization within the energy region of departure.

2. The method of claim 1 further comprising the steps of:

a. transmitting a plan polarized radio frequency wave; and b. signaling by periodically connecting the polarization of said wave from one antenna, said antenna radiating a characteristically polarized wave to another antenna, said another antenna radiating another characteristically polarized wave.

3. The method recited in claim 2 wherein said signaling is performed by modulating the transmitted energy to one of said first and said second polarized antennas and processing said modulated energy precedent to applying said energy to the other characteristically polarized antenna.

* * * * *